US010836445B2

(12) United States Patent
Czapka et al.

(10) Patent No.: US 10,836,445 B2
(45) Date of Patent: Nov. 17, 2020

(54) VEHICLE REAR WING WITH ADAPTIVE SECTION AND EXTENDABLE FLAP

(71) Applicant: Multimatic Inc., Markham (CA)

(72) Inventors: Richard Anthony Czapka, Uxbridge (CA); Joel David Causley, Markham (CA); Rudolf Gruber, Uxbridge (CA)

(73) Assignee: Multimatic Inc., Markham (CA)

( * ) Notice: Subject to any disclaimer, the term of this patent is extended or adjusted under 35 U.S.C. 154(b) by 303 days.

(21) Appl. No.: 16/066,116

(22) PCT Filed: Jan. 11, 2017

(86) PCT No.: PCT/US2017/013028
§ 371 (c)(1),
(2) Date: Jun. 26, 2018

(87) PCT Pub. No.: WO2017/123640
PCT Pub. Date: Jul. 20, 2017

(65) Prior Publication Data
US 2020/0283078 A1    Sep. 10, 2020

Related U.S. Application Data

(60) Provisional application No. 62/277,045, filed on Jan. 11, 2016.

(51) Int. Cl.
*B62D 35/00* (2006.01)
*B62D 37/02* (2006.01)
(52) U.S. Cl.
CPC .......... *B62D 35/007* (2013.01); *B62D 37/02* (2013.01)

(58) Field of Classification Search
CPC .. B62D 35/001; B62D 35/002; B62D 35/007; B62D 37/02
USPC ............................................ 296/180.1–180.5
See application file for complete search history.

(56) References Cited

U.S. PATENT DOCUMENTS

| 5,141,281 A | 8/1992 | Eger et al. |
| 6,030,028 A | 2/2000 | Radmanic et al. |
| 8,944,489 B2 | 2/2015 | Patterson et al. |
| 2014/0021742 A1 | 1/2014 | Durm et al. |

FOREIGN PATENT DOCUMENTS

| DE | 102013101689 A1 | 8/2014 |
| EP | 0454945 B1 | 3/1994 |
| EP | 2080694 A2 | 7/2009 |
| FR | 2874579 A1 | 3/2006 |

(Continued)

OTHER PUBLICATIONS

Indian Examination Report for Indian Application No. 201817024847 dated Feb. 11, 2020.

(Continued)

*Primary Examiner* — Dennis H Pedder
(74) *Attorney, Agent, or Firm* — Carlson, Gaskey & Olds, P.C.

(57) ABSTRACT

A deployable vehicle rear wing conforms closely to the styled surface of the vehicle body in a retracted, or stowed, position while adaptively changing its cross section in a deployed position so as to provide a highly efficient airfoil section, with an integrated Gurney flap. Additionally, the adaptive cross section changes and Gurney flap deployment is provided via a linkage that utilizes a drive mechanism of a main deployment system.

11 Claims, 6 Drawing Sheets

(56) References Cited

FOREIGN PATENT DOCUMENTS

JP          H026281 A    1/1990
JP          S6185246 A   4/1996

OTHER PUBLICATIONS

International Preliminary Report on Patentability for International Application No. PCT/US2017/013028 dated Jul. 26, 2018.
International Search Report and Written Opinion for International Application No. PCT/US2017/013028 dated Jul. 7, 2017.
Chinese Office Action for Chinese Patent Application No. 201780006300.2 dated Jun. 3, 2020.

VEHICLE REAR WING WITH ADAPTIVE SECTION AND EXTENDABLE FLAP

CROSS-REFERENCE TO RELATED APPLICATIONS

This application is a United States National Phase Application of PCT Application No. PCT/US2017/013028 filed Jan. 11, 2017, which claims priority to U.S. Provisional Application No. 62/277,045, which was filed on Jan. 11, 2016 and is incorporated herein by reference.

BACKGROUND

This invention relates to a deployable vehicle rear wing that adaptively optimizes its cross sectional shape during operation while simultaneously extending a trailing edge Gurney flap. Deployable rear aerodynamic elements generally cannot offer high operating efficiency as their geometric section is typically limited by the vehicle styling. The present invention overcomes this limitation by automatically modifying the aerodynamic element's geometric shape as it is deployed, so as to produce a highly efficient airfoil section with an extended Gurney flap, using a simple mechanical linkage.

It is well understood that a wing section mounted on the rear of a vehicle is desirable as it increases aerodynamic downforce which ultimately improves handling performance. However, it is also known that a supplemental wing increases aerodynamic drag and therefore degrades fuel economy and maximum speed capability of the vehicle. It has therefore become common to utilize deployable aerodynamic elements that can be retracted to achieve relatively low drag and extended when higher vehicle dynamic performance is required. However, the limitation of most deployable aerodynamic elements is that their geometric section is typically forced to conform to the vehicle styling, which limits efficiency. In the case of a wing element, the aerodynamic efficiency refers to the ratio of lift to drag, or L/D, where lift is the opposite of downforce, so represented as a negative number on a vehicle. The higher the negative lift, or downforce, can be made relative to a given drag, the higher the calculated efficiency becomes. Conversely the lower the drag can be made for a given downforce the higher the calculated efficiency becomes. The aircraft industry has spent considerable effort in optimizing the cross sectional shape of wings using the fundamental fluid mechanics laws as described by the Bernoulli principle and the behavior of continuum flow fields. In fixed wing vehicle applications L/D efficiencies of up to 4 have been achieved with careful development of the section and span shape. However these sections and shapes are highly specialized for the purpose and therefore do not conform to the styled shape of road vehicles.

U.S. Pat. No. 4,558,898 to Deaver and U.S. Pat. No. 5,678,884 to Murkett et al. both describe fixed wing applications on vehicles and clearly illustrate the specialized shape required by a highly efficient wing section. Their sections and shapes clearly do not conform to the styled surface of the vehicle bodies that they are attached to. U.S. Pat. No. 7,213,870 to Williams describes a novel adjustable rear wing that is fixed to the vehicle in which both the chord length and angle of attack of the section can be adaptively changed using actuators and a controller. In this manner the L/D of the rear wing can be automatically modified during vehicle operation. It is generally understood that increasing the chord length of the wing section creates higher downforce with minimal effect on drag, resulting in a more efficient L/D, and increasing the angle of attack of the wing section creates higher downforce with a significant effect on drag, resulting in a less efficient L/D. It should be noted that the '898, '884 and '870 patents utilize purpose developed cross sections that do not conform to the styled shape of the vehicle body to which they are mounted, and are permanently deployed such that the associated drag is always imparted on the vehicle.

U.S. Pat. No. 4,773,692 to Schleicher et al. describes a deployable rear spoiler that can be moved between a retracted position and an extended position using a novel mechanical arrangement that creates a dual motion that moves the deployable rear spoiler, or air deflector, away from the vehicle body and to an inclined position. The mechanical arrangement consists of an arcuate adjuster and guide channel in conjunction with an electric motor and cable drive. However, the cross section of the air deflector is clearly not of an optimized airfoil shape as it has been designed to conform to the styled shape of the vehicle body when in its retracted position. When deployed it offers the advantage of being oriented with an increased angle of attack from its stowed position, which is dictated by having to match the styled shape of the vehicle body, so that it generates a higher downforce than a simple vertical translation would produce. However, although potentially being able to generate adequate downforce, the non-airfoil section of the '692 spoiler would have a highly inefficient L/D therefore creating significant drag when deployed.

U.S. Pat. No. 4,854,635 to Durm et al. specifically claims a unique drive mechanism for the moving of an air guide arrangement on the rear of a vehicle from a retracted rest position to an extended operating position. The air guide device itself is clearly illustrated as a moveable panel on the sloping rear side of the vehicle which has no resemblance to an airfoil cross section and appears to function purely as a method of creating a discontinuity in the flow field of the air travelling over the body of the vehicle. A spoiler performs a significantly different function than a wing in that it is simply configured to eliminate the positive lift that the styled shape of the vehicle body creates. In the case of the '635 air guide arrangement there is no air flow underneath the moveable panel in its extended position which is a critical operating requirement of a wing. The panel would therefore only be capable of disturbing the airflow on the rear side of vehicle so as to eliminate the lift that the styled shape generates and although effecting a positive change to the vehicle lift it would not actually generate a measureable L/D efficiency.

U.S. Pat. No. 8,113,571 to Goenueldine describes an air guiding device on the rear end of a vehicle which is moveable relative to the rear end using a setting-out mechanism. Although the '571 patent claims a novel approach for the attachment of the setting-out mechanism to the underside of the air guiding device so as to help improve its aerodynamic and aeroacoustic performance, the cross section of the air guiding device, described as both a wing and a spoiler, is clearly not a fully optimized airfoil shape. However, the styled shape of the vehicle body appears to have been created to be of an aerodynamically efficient shape so that the moveable air guiding device is closer to an optimal cross section when deployed. Aspects of the shape, such as the blunt trailing edge, which is configured to match the vehicle body, still significantly reduce the L/D efficiency of the air guiding device.

U.S. Pat. No. 8,944,489 to Patterson et al. claims a variable aerodynamic device for a vehicle that is configured to move a wing element between a raised position and a lowered position relative to the vehicle body and additionally to a third, air brake condition when required. The deployment mechanism is configured to be driven by hydraulic actuators via a novel guide strut and linkage arrangement that results in a low angle of attack in the lowered position, an increased angle of attack in the raised position and an extreme, high drag, angle of attack in the air brake position. In this manner the wing element develops minimal drag and also downforce in the lowered position, increased downforce as well as drag in the raised position and extremely high drag in the air brake position with some increase in downforce. However the L/D efficiency in this third position would be extremely poor due to an undesirable aerodynamic characteristic known as stall in which the air flow on the underside of the wing element separates from the surface and causes significant disruption to the flow field so that Bernoulli's principle no longer applies. It is also evident from the illustrations that the wing element of the '489 patent does not conform to a classic airfoil cross section so as to match the styled surface of the vehicle body in the lowered position and so the L/D efficiency of the wing element would be far from optimized.

It is generally understood that the lift and drag of optimized wing sections can be modified by adding extensions to the main surfaces known as flaps or slats. In aircraft these extensions are configured to be deployable and create increased lift at lower air speed as an aid to take-off and landing. The deployment of these devices generally increases drag proportionally and in most cases actually decreases the L/D efficiency of the wing. The devices are retracted for normal flight as the additional lift is not required and the increased drag would be highly undesirable. In a specific subset of these types of devices it has been found that the addition of a relatively small upstanding, thin section flap at the trailing edge of a wing section creates an increase in downforce disproportionally larger than the increase in drag, therefore resulting in a higher L/D efficiency. The parameters associated with the thickness and height limitations to achieve the increase in L/D are well known and the device is generally referred to as a Gurney flap. The fixed wings on competition vehicles are rarely implemented without Gurney flaps. However, the use of Gurney flaps on deployable vehicle rear wings has not been adopted as the upstanding flap would create considerable drag in the retracted position and be difficult to match to the styled surface of the vehicle body.

U.S. Pat. No. 5,141,281 to Eger et al. claims a novel rear-end spoiler arrangement for a vehicle in which a flap is moved from an inoperative position flush with the vehicle body to an operative position that creates a breaking away of the air current passing the sloping rear side, or fast back, of the vehicle. The usage of the term flap to define the moving element in the specification and claims of the patent is not appropriate as the device should be technically described as a spoiler. This moving element performs in the same manner as described in the previously referenced '635 patent to Durm et al. The flap, or spoiler, of both the '635 and '281 patents eliminates the positive lift that the styled shape that the vehicle body creates, but has no air flow underneath the element in its operative position which is a critical operating requirement of an airfoil wing. An additional novelty of the '281 invention is the inclusion of an air current breakaway element which is constructed separately from the flap and independently extends in the transverse direction of the vehicle, in the operative position of the spoiler arrangement, the breakaway element extending adjacent to the rear edge of the flap. Although this breakaway element is a thin section, vertically oriented feature at the trailing edge of the main spoiler, it is not a Gurney flap as the main section that it modifies is not an airfoil and so the aerodynamic effect would not increase the L/D as there is no efficiency associated with the isolated element.

SUMMARY

In one exemplary embodiment, a deployable vehicle rear wing includes a rear mounted moveable element constructed from a main upper surface and a hinged lower surface that in a first configuration closely conforms to the surrounding styled surface of the vehicle body and in a second configuration provides an airfoil section with an integrated Gurney flap that is configured to provide an extended position. A lift mechanism includes an arrangement of rotating linkages and sliding components such that a first actuator is configured to drive a pair of fixed arms to move the moveable element between a stowed position and a deployed position. The lift mechanism includes a second pair of actuators interconnected to the moveable element and the rotating linkages. The second actuators are configured to move the moveable element between the deployed position and an air brake position. A flap linkage is packaged within the moveable element and coupled between the main upper surface and the hinged lower surface. The flap linkage incorporates a cam affixed with respect to the fixed arm so that the flap linkage is configured to move the hinged lower surface to the second configuration with the Gurney flap in the extended position in response to a change in relative position between the cam and the flap linkage.

In a further embodiment of any of the above, the lift mechanism includes a support structure. A pair of lift levers are pivotally mounted to the support structure. The pair of fixed arms are interconnected to the lift levers. A pair of guide collars are pivotally mounted to the support structure. The first actuator is interconnected to the lift levers and the support structure and is configured to move the moveable element between the stowed position and the deployed position by rotating the lift levers and causing the fixed arms to rise through the guide collars. The second pair of actuators are interconnected to the moveable element and the lift lever.

In a further embodiment of any of the above, the cam is coupled to a distal end of the fixed arms where they are rotationally mounted to the moveable element. A drive link is pivotally attached to the main upper surface at one end and to the hinged lower surface via a slotted rotational joint at another end so that as the lift mechanism deploys the moveable element, initially in the first configuration, the flap linkage pivots the hinged lower surface towards the main upper surface creating the second configuration. An airfoil section with a blunt rear section of the first configuration transforms the blunt rear section into the vertically oriented Gurney flap.

In a further embodiment of any of the above, when the lift mechanism moves the moveable element between the deployed position and the air brake position, the cam of the flap mechanism drives the hinged lower surface back to the first configuration.

In a further embodiment of any of the above, when the lift mechanism moves the moveable element between the deployed position and the stowed position, the cam of the flap mechanism drives the hinged lower surface back to the first configuration.

In a further embodiment of any of the above, the plan view shape of the moveable element includes a reduced centre cross section. The hinged lower surface is broken into two parts at the outer ends of the moveable element. Two identical flap linkages are utilized and driven individually by each of the two fixed arms.

In a further embodiment of any of the above, the first and second actuators are hydraulic.

In a further embodiment of any of the above, the second actuators each include a spring arranged beneath a cover that is secured to a cylinder that includes a flange. A rod of each of the second actuators is telescopically arranged with respect to the cylinder of the respective second actuator. The spring is in a compressed state between the flange and the cover of the respective second actuator in an extended actuator position. The spring is configured to force the respective rod into the respective cylinder to a collapsed position that provides the air brake position.

In another exemplary embodiment, a deployable vehicle rear wing includes a rear mounted moveable element constructed from a main upper surface and a hinged lower surface. In a first configuration it closely conforms to the surrounding styled surface of the vehicle body and in a second configuration it provides an airfoil section with an integrated Gurney flap that is configured to provide an extended position. A lift mechanism includes a support structure. A pair of lift levers are pivotally mounted to the support structure. A pair of fixed arms are interconnected to the lift levers and cooperate with a pair of guide collars pivotally mounted to the support structure. A first actuator is interconnected to the lift levers and the support structure and is configured to move the moveable element between a stowed position and a deployed position by rotating the lift levers and causing the fixed arms to rise through the guide collars. A second pair of actuators are interconnected to the moveable element and the lift levers. The second actuators are configured to move the moveable element between the deployed position and an air brake position. A flap linkage is packaged within the moveable element that includes a cam that is coupled to a distal end of the fixed arms where they are rotationally mounted to the moveable element. A drive link is rotationally attached to the main upper surface at one end and to the hinged lower surface via a slotted rotational joint at another end so that as the lift mechanism deploys the moveable element, initially in the first configuration, the flap linkage pivots the hinged lower surface towards the main upper surface creating the second configuration. An airfoil section with a blunt rear section of the first configuration transforms the blunt rear section into the vertically oriented Gurney flap.

BRIEF DESCRIPTION OF THE DRAWINGS

The disclosure can be further understood by reference to the following detailed description when considered in connection with the accompanying drawings wherein.

DETAILED DESCRIPTION

Accordingly, in view of the limitations of the prior art it would be advantageous to provide a deployable vehicle rear wing that conforms closely to the styled surface of the vehicle body in a retracted, or stowed, position while adaptively changing its cross section in the deployed position so as to provide a highly efficient airfoil section with an integrated Gurney flap. Additionally, it would be highly desirable to provide the adaptive cross section change and Gurney flap deployment via a linkage that utilizes the drive mechanism of the main deployment system.

In a primary embodiment of the present invention the lower surface of a moveable element, that closely matches the styled surface of the vehicle body, is adapted to hinge around a predetermined point so that as the moveable element is moved between a stowed and deployed position, the lower surface is rotated around the hinge axis to eliminate the blunt trailing edge of the section, defined by the vehicle body, to create a highly desirable sharp trailing edge with a vertically extending Gurney flap. A main lift mechanism creates a combined motion path that lifts the moveable element into the free stream of air passing over the vehicle while also increasing its angle of attack. The cross section change is driven by a linkage arrangement that is coupled to the main deployment motion so that when the moveable element is fully deployed, with an associated vertical lift and increased angle of attack, it is also a fully optimized airfoil section with an associated high L/D efficiency. In this manner the moveable element provides an aesthetically pleasing shape that conforms to the styled surface of the vehicle body and creates very little drag or downforce in its stowed position. Additionally in its deployed position the moveable element provides a highly efficient airfoil section with an integrated Gurney flap that is located in the free stream air flow over the vehicle with an optimized angle of attack to provide a high level of downforce with an efficient L/D.

An additional feature of the lift mechanism is an ability to generate an extreme angle of attack during selected events such as high braking demand so that aerodynamic drag assists in decelerating the vehicle. A consequence of this air brake position is a highly inefficient element that results in aerodynamic stall but extremely high drag. In this condition the lower surface of the moveable element returns to its stowed position shape with the Gurney flap retracted.

Figure 1:
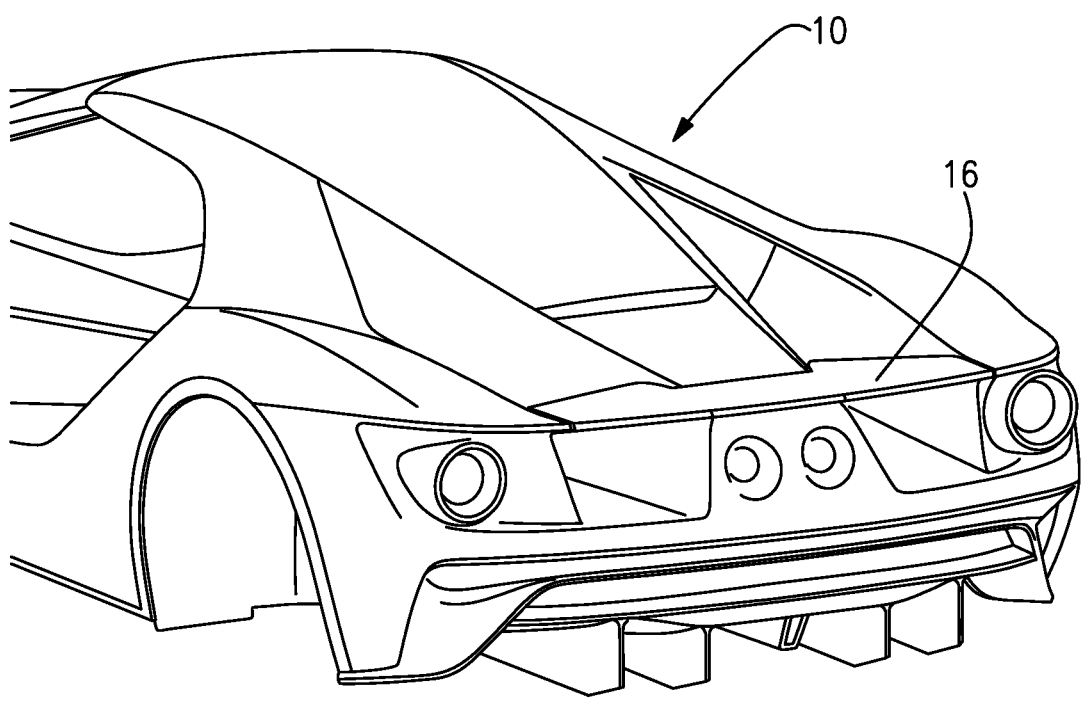
FIG. 1 is a perspective view of the deployable vehicle rear wing, shown in its stowed position in the vehicle body.
Figure 2:
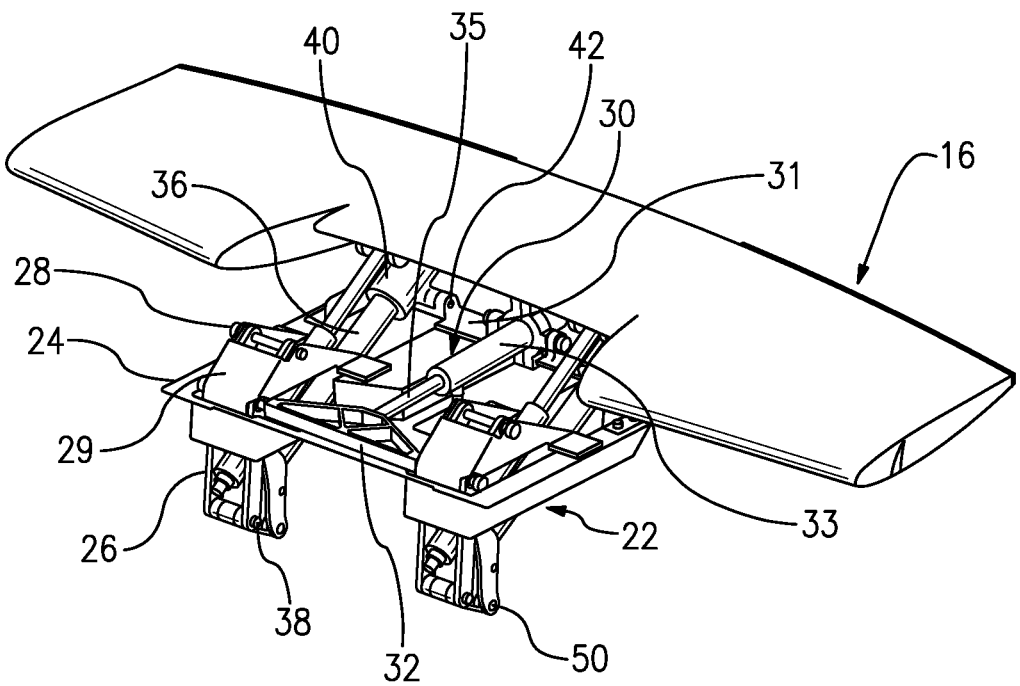
FIG. 2 is a perspective view of the deployable vehicle rear wing, shown in isolation in its stowed position including its supporting structure.

FIG. 1 illustrates the rear of a vehicle body 10 with an integrated moveable element 16 that is designed to conform to the styled surface of the vehicle body 10. FIG. 2 shows a perspective view of the moveable element 16 and a lift mechanism 22 that translates the moveable element 16 rearward, upwards and into positive angle of attack along an arcuate path from stowed position shown in FIG. 4 to a deployed position shown in FIG. 5. The lift mechanism 22 includes a support structure 24, as best shown in FIG. 2, which is secured to the vehicle body. The support structure 24 includes first and second brackets 29, 31. A pair of lift levers 26 are mounted for rotation with respect to the support structure 24 by first pivotal connections 28 provided by the first brackets 29.

A first actuator 30 (e.g., hydraulic), which includes a cylinder 33 and a rod 35, is interconnected between the support structure 24 and the lift levers 26 via a bar 32 at second pivotal connection 34. In operation, the rod 35 is retracted from the stowed position to move the moveable element 16 to the deployed position, which rotates the lift levers 26 rearward about the first pivotal connections 28.

A pair of fixed arms 36 are secured between each pair of lift levers 26 at third pivotal connections 38. A pair of guide collars 40 are slidably received on each fixed arm 36 and secured to the support structure 24 via the second brackets 31 at a fourth pivotal connection 42. An end of the fixed arms 36 opposite the lift levers 26 is connected to the moveable element 16 at fifth pivotal connections 44.

A second pair of actuators 46 (e.g., hydraulic) are secured between each pair of lift levers 26 by a leg 48 secured at sixth pivotal connections 50. The second actuators 46 include a cylinder 52 secured to its respective leg 48, and a rod 54 extends from the cylinder 52 and is connected to the moveable element 16 at seventh pivotal connections 56. The second actuators 46 are in an extended position throughout the stowed and deployed positions.

Figure 8A:
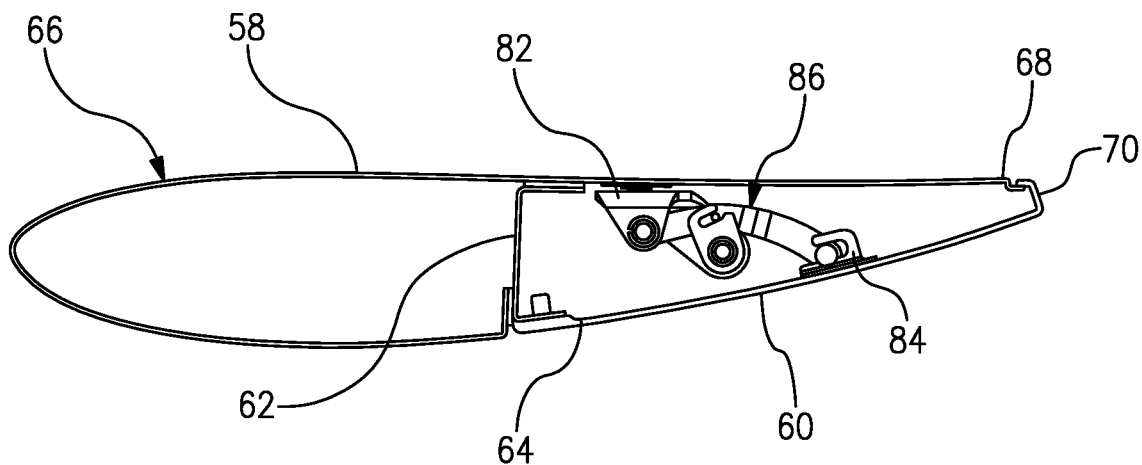
FIGS. 8 A, B are isolated partial sectional side views of the deployable vehicle rear wing, shown in its stowed and deployed positions respectively.
Figure 8B:
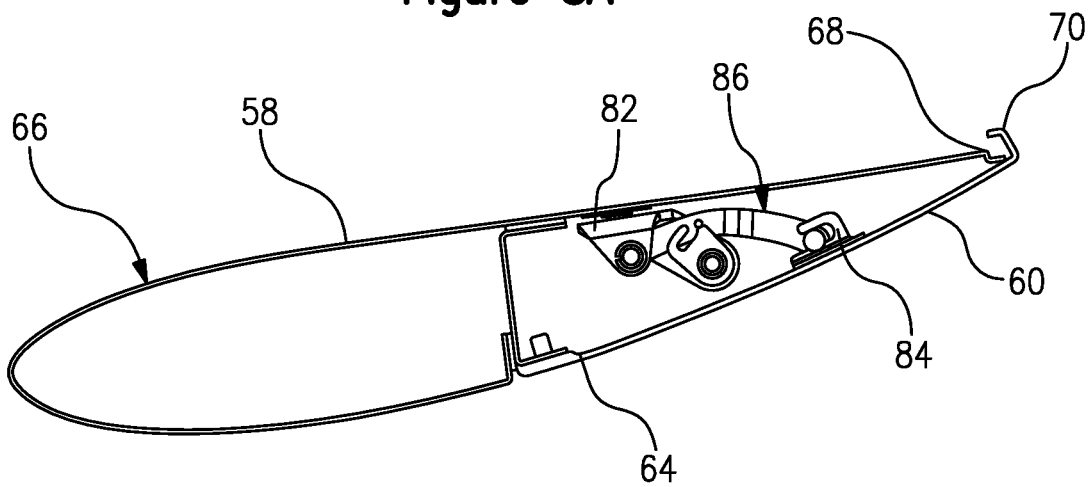

The moveable element 16 includes a main upper surface 58 with a trailing edge 68 and a hinged lower surface 60. The moveable element includes a stiffening rib 62 extending laterally within its interior volume. The hinged lower surface 60 includes a lip 70 arranged near the trailing edge 68. The hinged lower surface 60 is rotationally secured to the main upper surface 58 via a hinge 64 at the stiffening rib 62. Together the main upper surface 58 and hinged lower surface 60 create an exterior surface 66 that in a first configuration, best illustrated in FIG. 8A, conforms to the surrounding styled surface of the vehicle body, and in a second configuration, best illustrated in FIG. 8B, provides a highly efficient airfoil section with an integrated Gurney flap.

Figure 4:
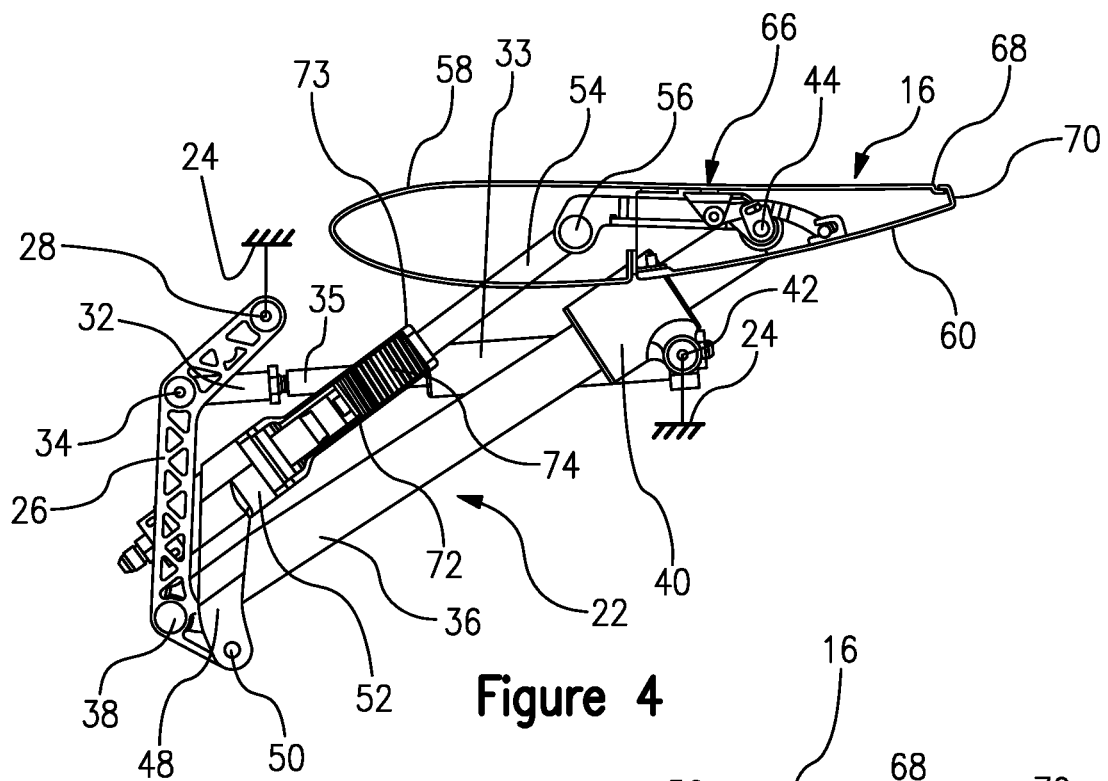
FIG. 4 is a partial sectional side view of the deployable vehicle rear wing, shown in its stowed position.
Figure 5:
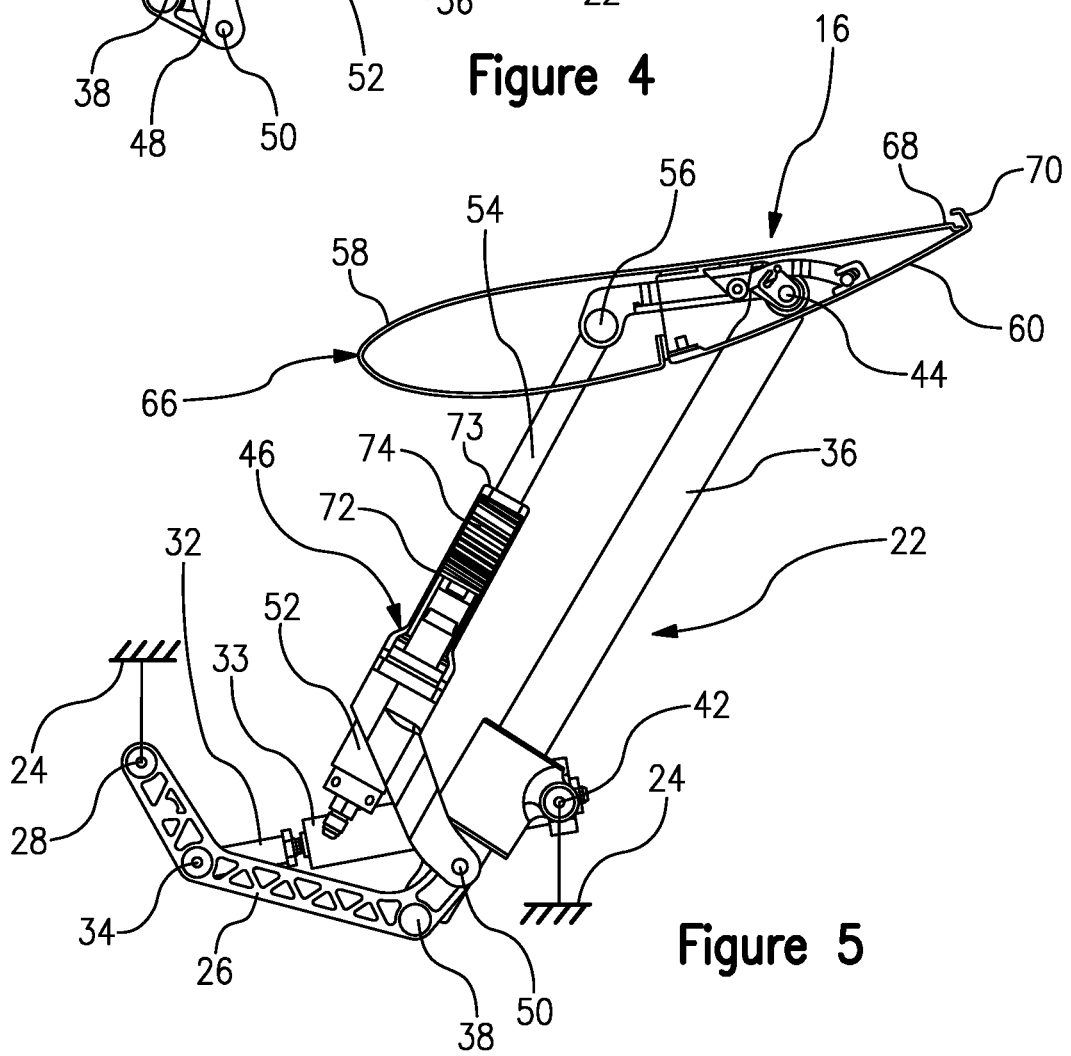
FIG. 5 is a partial sectional side view of the deployable vehicle rear wing, shown in its deployed position.

The transition of the exterior surface 66 of the moveable element 16 from the first configuration to the second configuration is coupled directly to the translation of the lift mechanism 22 from the stowed position shown in FIG. 4 to a deployed position shown in FIG. 5. In operation, as the first actuator 30 is retracted, the lift levers 26 are rotated upward and rearward, sliding the fixed arms 36 upward through the guide collars 40. Due to the geometry of the components of the lift mechanism 22, as the moveable element 16 is translated rearward and upward its angle of attack is also increased.

In the example embodiment, the hinged lower surface 60 is driven between the first configuration and the second configuration without using a separate actuator, although one may be used if desired. Instead, the hinged lower surface is passively driven using interlinked components moved by virtue of the lift mechanism's 22 changing geometry, which is described in more detail in connection with FIGS. 8A-8B. Once the moveable element 16 reaches the deployed position, as shown in FIG. 5, the hinged lower surface 60 moves to the second configuration, which extends the lip 70 beyond the trailing edge 68. In this manner the lip 70 creates the effect of a Gurney flap on a sharp trailing edge airfoil which significantly increases the aerodynamic efficiency of the deployed moveable element.

Figure 3:
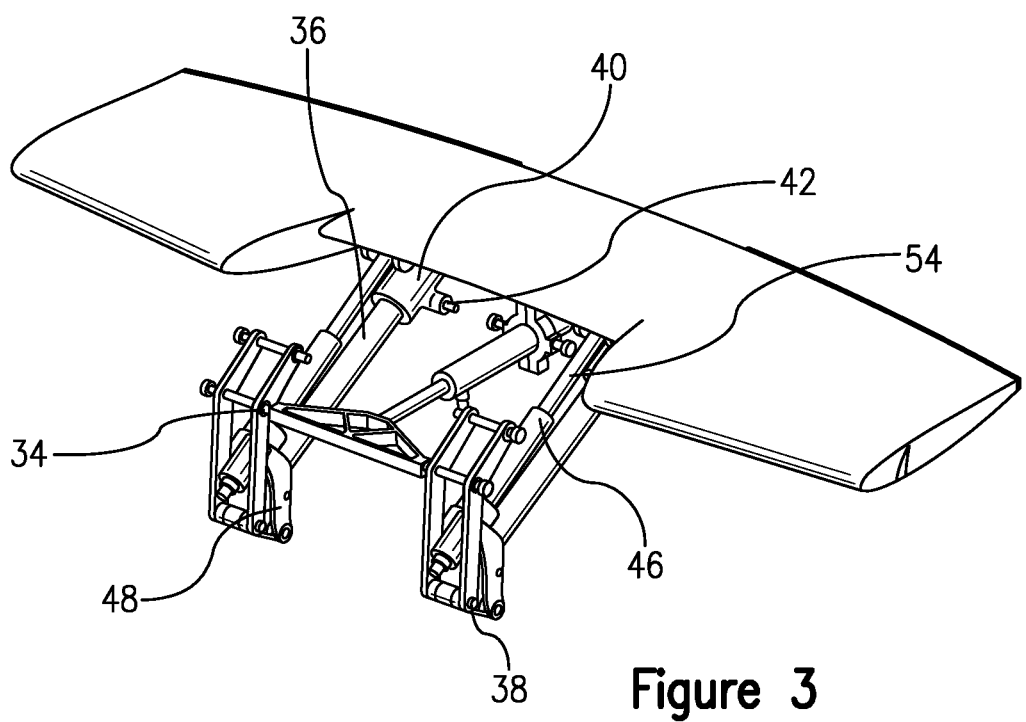
FIG. 3 is a perspective view of the deployable vehicle rear wing, shown in isolation in its stowed position excluding its supporting structure.
Figure 6:
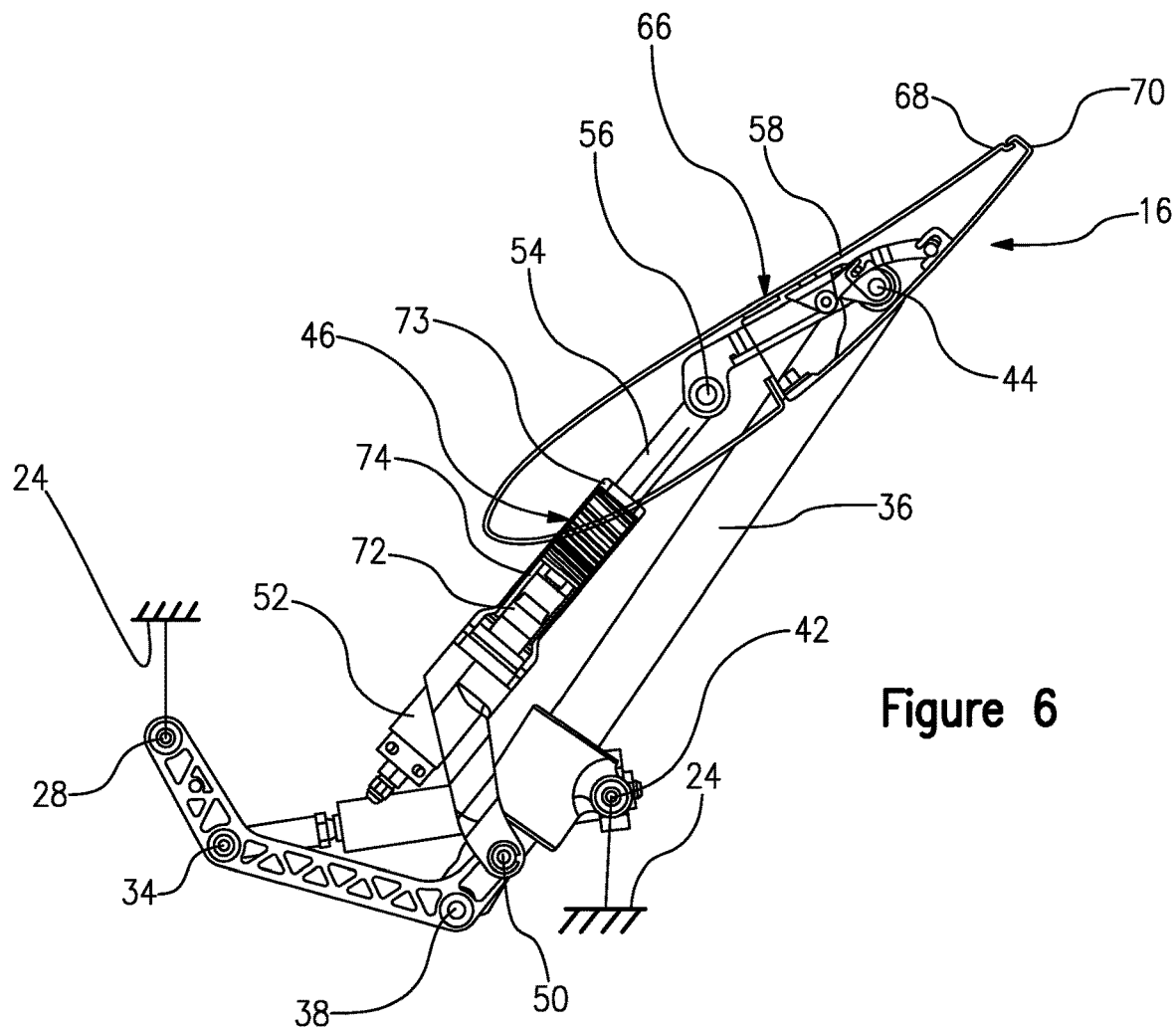
FIG. 6 is partial sectional side view of the deployable vehicle rear wing, shown in its air brake position.

Referencing FIGS. 3, 4 and 5, the second actuators 46 each include a spring 74 arranged beneath a cover 73 that is secured to the cylinder 52. A rod 54 cooperates with the cylinder 52 and includes a flange 72. The spring 74 is in a compressed state between the flange 72 and cover 73 with the second actuators 46 in the extended position. In operation, to move the moveable element 16 from the deployed position (FIG. 5) to the air brake position (FIG. 6), a hydraulic valve associated with the cylinder 52 is opened, which enables the spring 74 to force the rod 54 into the cylinder 52 thereby collapsing the second actuators 46. Aerodynamic forces on the moveable element 16 assist in the collapse of the second actuators 46, which are attached at a pivotal connection 56 which is located ahead of the fixed arm's 36 pivotal connection 44. In the example embodiment, the hinged lower surface 60 returns to its first configuration, with the Gurney flap retracted, when the moveable element 16 moves to the air brake position.

Actuation of the hinged lower surface 60 is explained in more detail in connection with FIGS. 9A-9C. A shaft 76 extends laterally outward from each fixed arm 36 coaxially with the pivotal connections 44. Each shaft 76 is rotationally fixed with respect to the pivotal connections 44 by interlocking features.

Figure 7:
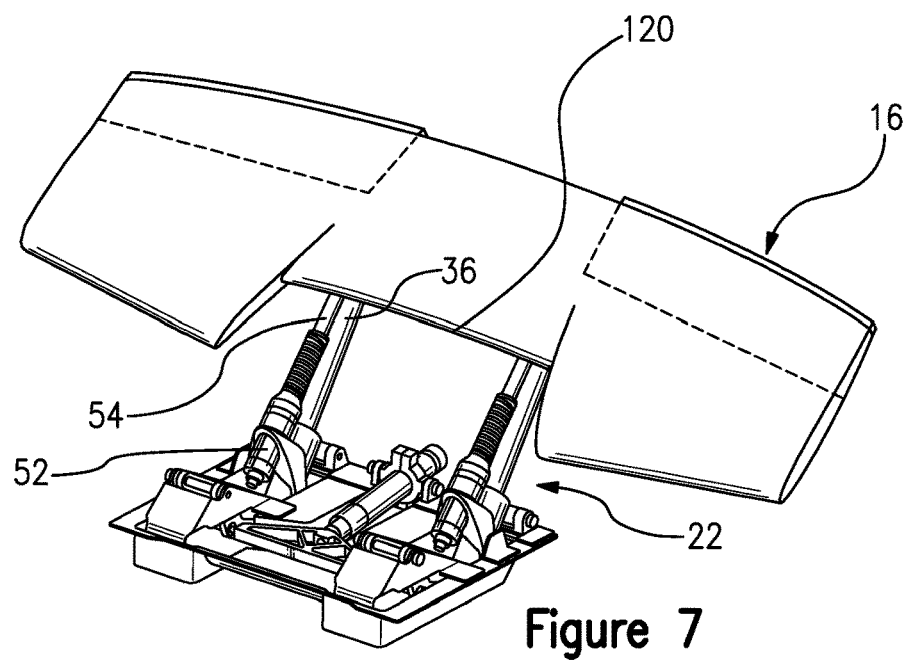
FIG. 7 is a perspective view of the deployable vehicle rear wing, shown in isolation in its air brake position.
Figure 9A:
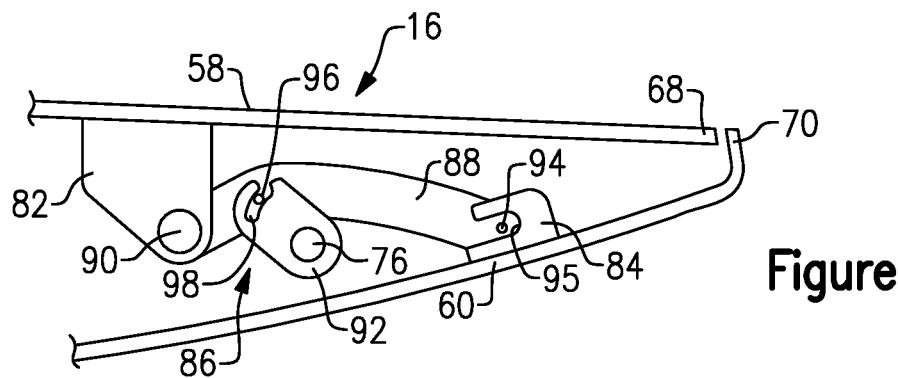
FIGS. 9 A, B, C are isolated partial sectional side views of the deployable vehicle rear wing, shown in its stowed, deployed and air brake positions respectively The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.
Figure 9B:
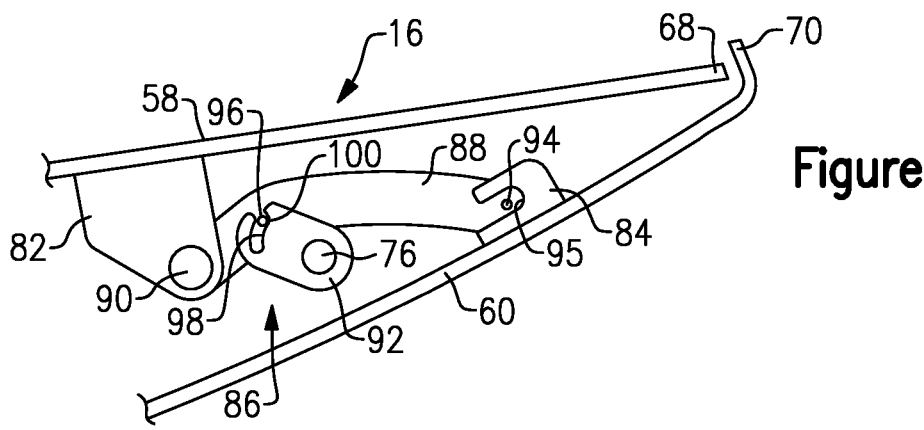
Figure 9C:
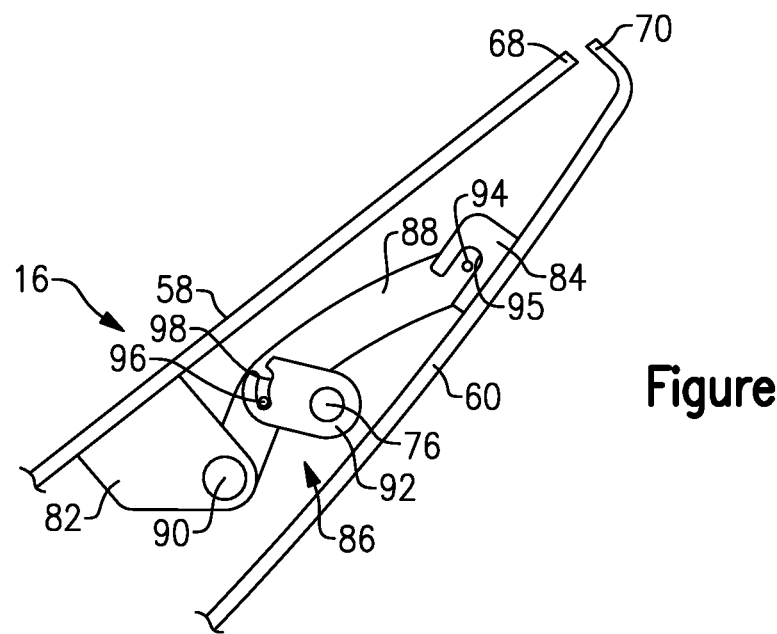

Referring to FIG. 9A, a first support bracket 82 is secured to the main upper surface 58, and a second support bracket 84 is secured to hinged lower surface 60. A flap linkage 86 is coupled between the first and second support brackets 82, 84. The hinged lower surface 60 is broken into two parts at the outer ends of the moveable element 16, as shown by the hidden lines in FIG. 7. The plan view shape of the moveable element 16 includes a reduced centre cross section 120. Two identical flap linkages 86 are utilized and driven individually by each of the two fixed arms 36.

The flap linkage 86 includes a drive link 88 attached to the first support bracket 82 at one end by a pivot 90. The second support bracket 84 includes a slot 95 that receives a first pin 94 at the other end of the drive link 88. The slot 95 enables the hinged lower surface 60 to be secured to the main upper surface 58 during assembly with the drive link 88 already installed on the first support bracket 82.

The flap linkage 86 includes a cam 92 that is affixed to the shaft 76. A second pin 96 extending from the drive link 88 is received within a slot 98 in the cam 92 to provide a slotted rotational joint that includes a ramped surface 100. Referring to FIGS. 9A, 9B and 9C, the second pin 96 is shown in three positions which respectively correspond to the moveable element 16 being in the stowed, deployed and air brake positions. As depicted in the figures, the shaft 76 maintains the position of the cam 92 throughout all operational positions of the moveable element 16. However, the moveable element 16 articulates with respect to the cam 92 as the geometry of the lift mechanism 22 changes. As the moveable element 16 articulates from the stowed position (FIG. 9A) to the deployed position (FIG. 9B), the drive link 88 cants upward causing the second pin 96 to move up the ramped surface 100 which rotates the hinged lower surface 60 around the hinge 64 towards the main upper surface 58 as the first pin 94 pulls upward on the second support bracket 84.

As the moveable element 16 continues to articulate from the deployed position (FIG. 9B) to the air brake position (FIG. 9C), the second pin 96 slides from the ramped surface 100 back down into the slot 98, which permits the hinged lower surface 60 to return to the retracted position.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A deployable vehicle rear wing comprising:
a rear mounted moveable element constructed from a main upper surface and a hinged lower surface, that in a first configuration closely conforms to the surrounding styled surface of the vehicle body and in a second configuration provides an airfoil section with an integrated Gurney flap;
a lift mechanism including an arrangement of rotating linkages and sliding components such that a first actuator is configured to drive a pair of fixed arms to move the moveable element between a stowed position and a deployed position, the lift mechanism includes a second pair of actuators interconnected to the moveable element and the rotating linkages, the second actuators configured to move the moveable element between the deployed position and an air brake position; and
a flap linkage packaged within the moveable element and coupled between the main upper surface and the hinged lower surface, the flap linkage incorporating a cam affixed with respect to the fixed arm so that the flap linkage is configured to move the hinged lower surface to the second configuration with the Gurney flap in an extended position in response to a change in relative position between the cam and the flap linkage.

2. The deployable vehicle rear wing of claim 1, wherein the lift mechanism includes a support structure, a pair of lift levers pivotally mounted to the support structure, the pair of fixed arms interconnected to the lift levers, a pair of guide collars are pivotally mounted to the support structure, the first actuator interconnected to the lift levers and the support structure and configured to move the moveable element between the stowed position and the deployed position by rotating the lift levers and causing the fixed arms to rise through the guide collars, and the second pair of actuators interconnected to the moveable element and the lift lever.

3. The deployable vehicle rear wing of claim 1, wherein the cam is coupled to a distal end of the fixed arms where they are rotationally mounted to the moveable element, a drive link is pivotally attached to the main upper surface at one end and to the hinged lower surface via a slotted rotational joint at another end so that as the lift mechanism deploys the moveable element, initially in the first configuration, the flap linkage pivots the hinged lower surface towards the main upper surface creating the second configuration, an airfoil section with a blunt rear section of the first configuration, transforming the blunt rear section into the vertically oriented Gurney flap.

4. The deployable vehicle rear wing of claim 1, wherein the lift mechanism is configured to move the moveable element upward and rearward along an arcuate path from the stowed position to the deployed position.

5. The deployable vehicle rear wing of claim 2, wherein the lift mechanism is configured to move the moveable element upward and rearward along an arcuate path from the stowed position to the deployed position.

6. The deployable vehicle rear wing of claim 1, wherein when the lift mechanism moves the moveable element between the deployed position and the air brake position, the cam of the flap mechanism drives the hinged lower surface back to the first configuration.

7. The deployable vehicle rear wing of claim 1, wherein when the lift mechanism moves the moveable element between the deployed position and the stowed position, the cam of the flap mechanism drives the hinged lower surface back to the first configuration.

8. The deployable vehicle rear wing of claim 1, wherein the plan view shape of the moveable element includes a reduced centre cross section, and the hinged lower surface is broken into two parts at the outer ends of the moveable element, and two identical flap linkages are utilized and driven individually by each of the two fixed arms.

9. The deployable vehicle rear wing of claim 1, wherein the first and second actuators are hydraulic.

10. The deployable vehicle rear wing of claim 1, wherein the second actuators each include a spring arranged beneath a cover that is secured to a cylinder and each includes a rod comprising a flange, the rod of each of the second actuators is telescopically arranged with respect to the cylinder of the respective second actuator, the spring is in a compressed state between the flange and the cover of the respective second actuator in an extended actuator position, and the spring is configured to force the respective rod into the respective cylinder to a collapsed position that provides the air brake position.

11. A deployable vehicle rear wing comprising:
a rear mounted moveable element constructed from a main upper surface and a hinged lower surface, that in a first configuration closely conforms to the surrounding styled surface of the vehicle body and in a second configuration provides an airfoil section with an integrated Gurney flap that is configured to provide an extended position;
a lift mechanism including a support structure, a pair of lift levers pivotally mounted to the support structure, a pair of fixed arms interconnected to the lift levers and cooperating with a pair of guide collars pivotally mounted to the support structure, a first actuator interconnected to the lift levers and the support structure and configured to move the moveable element between a stowed position and a deployed position by rotating the lift levers and causing the fixed arms to rise through the guide collars, and a second pair of actuators interconnected to the moveable element and the lift levers, the second actuators configured to move the moveable element between the deployed position and an air brake position; and
a flap linkage packaged within the moveable element that includes a cam that is coupled to a distal end of the fixed arms where they are rotationally mounted to the moveable element, a drive link that is rotationally attached to the main upper surface at one end and to the hinged lower surface via a slotted rotational joint at another end so that as the lift mechanism deploys the moveable element, initially in the first configuration, the flap linkage pivots the hinged lower surface towards the main upper surface creating the second configuration, an airfoil section, with a blunt rear section of the first configuration, transforming the blunt rear section into the vertically oriented Gurney flap.

\* \* \* \* \*